US007496565B2

(12) United States Patent
Thind et al.

(10) Patent No.: US 7,496,565 B2
(45) Date of Patent: Feb. 24, 2009

(54) METHOD AND SYSTEM FOR MAINTAINING NAMESPACE CONSISTENCY WITH A FILE SYSTEM

(75) Inventors: Ravinder S. Thind, Kirkland, WA (US); Sarosh Cyrus Havewala, Redmond, WA (US); Neal R. Christiansen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 370 days.

(21) Appl. No.: 11/000,430

(22) Filed: Nov. 30, 2004

(65) Prior Publication Data

US 2006/0116985 A1 Jun. 1, 2006

(51) Int. Cl.
G06F 7/00 (2006.01)
G06F 17/30 (2006.01)
G06F 15/16 (2006.01)

(52) U.S. Cl. .............................. 707/3; 707/9; 709/202
(58) Field of Classification Search .................. 707/10; 709/310
See application file for complete search history.

(56) References Cited

U.S. PATENT DOCUMENTS

| | | | |
|---|---|---|---|
| 5,761,678 A | 6/1998 | Bendert | |
| 5,832,501 A | 11/1998 | Kain | |
| 6,119,118 A | 9/2000 | Kain | |
| 6,126,211 A | 10/2000 | McBrearty | |
| 6,389,427 B1 | 5/2002 | Faulkner | |
| 6,408,298 B1 * | 6/2002 | Van et al. ...................... 707/10 |
| 6,473,806 B1 * | 10/2002 | Snyder et al. ................ 719/310 |
| 6,513,051 B1 | 1/2003 | Bolosky | |
| 6,578,035 B1 | 6/2003 | Barker | |
| 6,687,701 B2 * | 2/2004 | Karamanolis et al. ......... 707/10 |
| 6,708,186 B1 * | 3/2004 | Claborn et al. .............. 707/102 |
| 6,976,060 B2 | 12/2005 | Manczak | |
| 7,043,485 B2 | 5/2006 | Manley | |
| 7,120,631 B1 | 10/2006 | Vahalia | |
| 7,146,524 B2 | 12/2006 | Patel | |
| 7,284,150 B2 | 10/2007 | Ma | |
| 2003/0033308 A1 | 2/2003 | Patel | |
| 2003/0167277 A1 * | 9/2003 | Hejlsberg et al. ........... 707/102 |
| 2004/0133570 A1 | 7/2004 | Soltis | |
| 2004/0153479 A1 | 8/2004 | Mikesell | |

(Continued)

FOREIGN PATENT DOCUMENTS

| | | |
|---|---|---|
| EP | 0856803 | 8/1998 |
| EP | 1376405 | 6/2003 |
| WO | WO0177908 | 10/2001 |

OTHER PUBLICATIONS

Aranya, Akshat, et al., "Traceefs: File System to Trace Them All", FAST 2004, San Francisco, CA, Mar. 31-Apr. 2, 2004, pp. 1-25.

(Continued)

Primary Examiner—Tony Mahmoudi
Assistant Examiner—Paul Kim
(74) Attorney, Agent, or Firm—Workman Nydegger

(57) ABSTRACT

A method and system for maintaining namespace consistency between selected objects maintained by a file system and a filter associated therewith. A filter monitors selected types of requests (or operations associated therewith) and determines whether the object is within a namespace associated with the filter. The namespace associated with the filter is updated based on a change to the object.

22 Claims, 15 Drawing Sheets

U.S. PATENT DOCUMENTS

| | | |
|---|---|---|
| 2004/0225719 A1 | 11/2004 | Kisley |
| 2005/0246397 A1 | 11/2005 | Edwards |
| 2005/0246401 A1 | 11/2005 | Edwards |
| 2005/0251522 A1 | 11/2005 | Clark |
| 2006/0026161 A1 | 2/2006 | Hensler |
| 2006/0117056 A1 | 6/2006 | Havewala |

OTHER PUBLICATIONS

Bolosky, William J., et al., "Single Instance Storage in Windows® 2000", 4th USENIX Windows Systems Symposium, Seattle, WA, Aug. 3-4, @000, pp. 1-12.

"Volume Definition", PCMag.com encyclopedia, © 1981-2007, 1 page (downloaded from: www.pcmag.com/encyclopedia_term/ 0,2542,t=volume&i=54097,00,asp).

"Volume Definition", SearchStorage.com, May 23, 2001, pp. 1-2 (downloaded from: searchstorage.techtarget.com/sDefinition/ 0,,sid5_gci214464,00.html).

Moreton, Tim D., et al., "Storage, Mutability and Naming Pasta", Lecture Notes in Computer Science, vol. 2376/2002, © 2002, pp. 215-219.

Menon, Jai, et al., "IBM Storage Tank—A Heterogeneous Scalable SAN File System", IBM Systems Journal, vol. 42, No. 2, © 2003, pp. 250-267.

Karamanolis, C., et al., "An Architecture for Scalable and Manageable File Services", Hewlett-Packard Labs Technical Report HPL-2001-173, Palo Alto, CA, © 2001, pp. 1 and 1-14 (downloaded from: web.archive.org/web/20040503083445/http://www.hpl.hp.com/ techreports/2001/HPL-2001-173.pdf).

Chen, Yong, et al., "CoStore: A Storage Cluster Architecture Using Network Attached Storage Devices", ICPADS '02, Dec. 17-20, 2002, pp. 301-306.

Zhang, Zheng et al., "Designing a Robust Namespace for Distributed Storage Systems", Proceedings of the 20th IEEE Symposium on Reliable Distributed Systems (2001), New Orleans, LA, Oct. 28-31, pp. 162-171.

Brandt, Scott A., et al., "Efficient Metadata Management in Large Distributed Storage Systems", MSS '03, Apr. 7-10, 2003, pp. 290-298.

Ghemawat, Sanjay, et al., "The Google File System", SOSP '03, Bolton Landing NY, Oct. 19-22, 2003, pp. 29-43.

Office Action dated Mar. 22, 2007 cited in related U.S. Appl. No. 11/000,180.

Office Action dated Jan. 10, 2008 cited in related U.S. Appl. No. 11/000,180.

Office Action dated Jun. 30, 2008 cited in related U.S. Appl. No. 11/000,180.

* cited by examiner

METHOD AND SYSTEM FOR MAINTAINING NAMESPACE CONSISTENCY WITH A FILE SYSTEM

FIELD OF THE INVENTION

The invention relates generally to computers, and more particularly to file systems.

BACKGROUND

With contemporary operating systems, such as Microsoft Corporation's Windows® XP operating system with an underlying file system such as the Windows® NTFS (Windows® NT File System), FAT, CDFS, SMB redirector filesystem, or WebDav file systems, one or more file system filter drivers may be inserted between the I/O manager that receives user I/O requests and the file system driver. In general, filter drivers (sometimes referred to herein simply as "filters") are processes that enhance the underlying file system by performing various file-related computing tasks that users desire, including tasks such as passing file system I/O (requests and data) through anti-virus software, file system quota providers, file replicators, and encryption/compression products.

For example, antivirus products provide a filter that watches I/O to and from certain file types (.exe, .doc, and the like) looking for virus signatures, while file replication products perform file system-level mirroring. Other types of file system filter drivers are directed to system restoration (which backs up system files when changes are about to be made so that the user can return to the original state), disk quota enforcement, backup of open files, undeletion of deleted files, encryption of files, and so forth. Thus, by installing file system filter drivers, computer users can select the file system features they want and need, in a manner that enables upgrades, replacement, insertion, and removal of the components without changing the actual operating system or file system driver code.

A file system filter may maintain internal metadata for files and directories on a volume. Changes to a volume that a filter is associated with may cause the internal metadata of the filter to be out of sync with the state of the volume. This may cause the filter to behave incorrectly or render it unable to perform its desired function.

What is needed is a method and system for maintaining namespace consistency between selected objects maintained by a file system and a filter associated therewith.

SUMMARY

Briefly, the present invention provides a method and system for maintaining namespace consistency between selected objects maintained by a file system and a filter associated therewith. A process requests access to an object of the file system. A filter monitors selected types of requests (or operations associated therewith) and determines whether the object is within a namespace associated with the filter. The namespace associated with the filter is updated based on a change to the object.

In one aspect of the invention, the request comprises a rename or delete operation. An object is within the namespace associated with a filter if the object has a policy associated with it or if the object is an ancestor of such an object.

In another aspect of the invention, a rename operation may cause the object to be moved and/or renamed.

In another aspect of the invention, an object is accessed by opening a handle to the object. A handle comprises information that identifies a communication channel used to access the object. A flag may be set that indicates that the object should be deleted when all handles to the object are closed. If the flag remains set after the last handle is closed, the object is deleted.

In one aspect of the invention, maintaining namespace consistency allows filters to apply policies on objects when the objects are renamed and to stop applying policies on objects that are deleted.

Other aspects will become apparent from the following detailed description when taken in conjunction with the drawings, in which:

DETAILED DESCRIPTION

Exemplary Operating Environment

Figure 1:
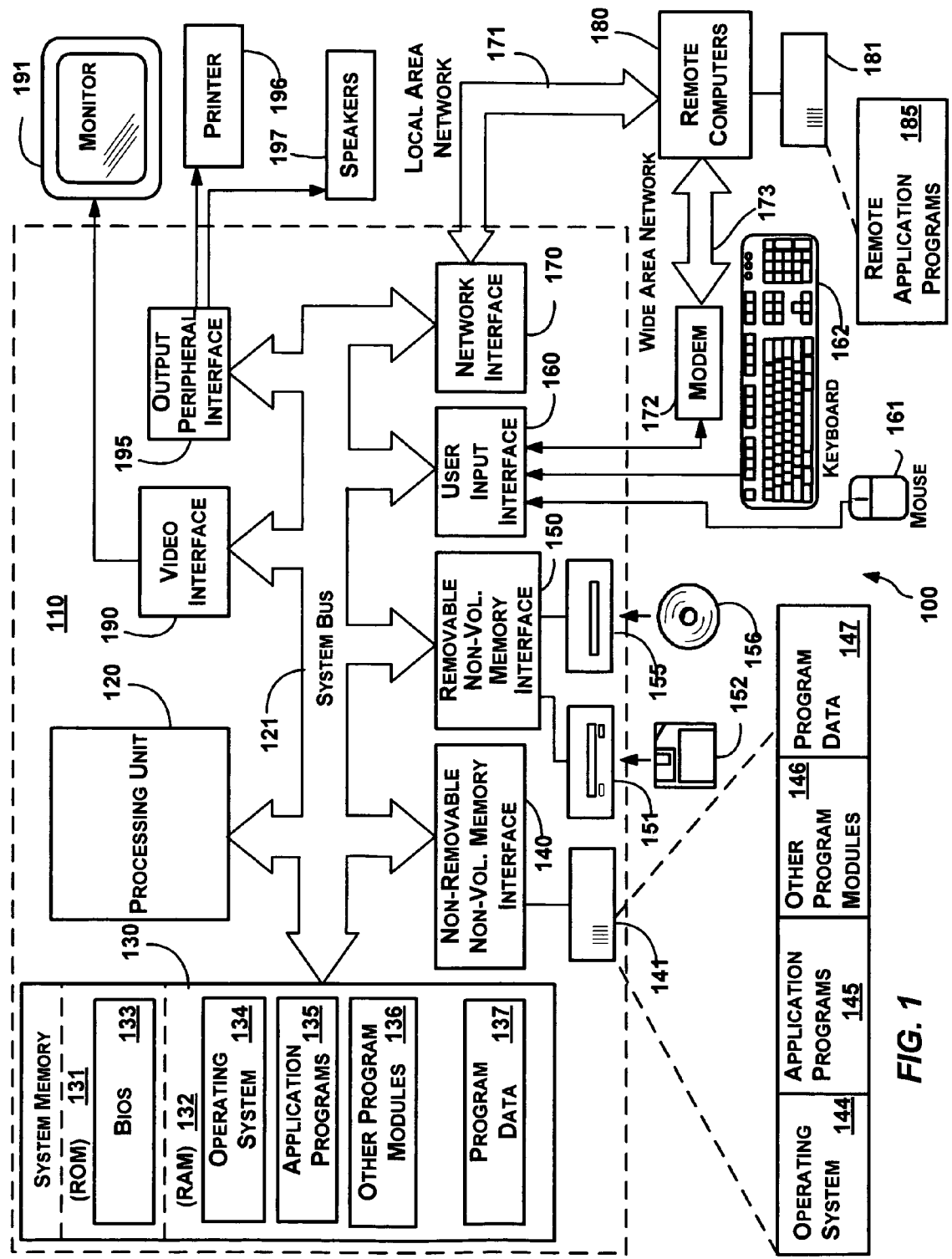
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Maintaining Namespace Consistency

Figure 2:
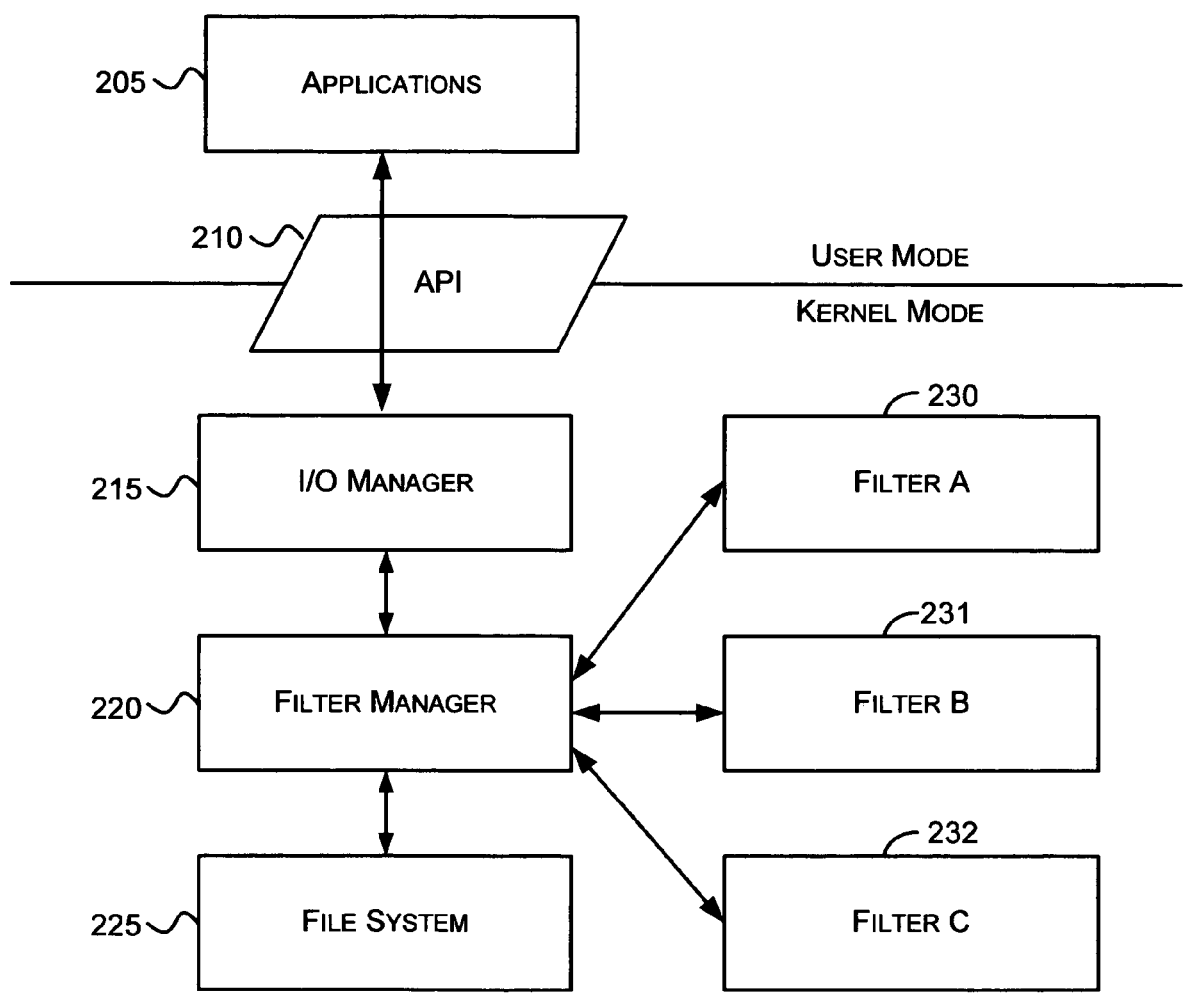
FIG. 2 is a block diagram representing an exemplary arrangement of components of a system in which the present invention may operate in accordance with various aspects of the invention.

FIG. 2 is a block diagram representing an exemplary arrangement of components of a system in which the present invention may operate in accordance with various aspects of the invention. The components include one or more applications 205, an applications programming interface (API) 210, an input/output (I/O) manager 215, a filter manger 220, a file system 225, and one or more filters 230-232.

The applications 205 may make file system requests (e.g., via function/method calls) through the API 210 to the I/O manager 215. The I/O manager 215 may determine what I/O request or requests should be issued to fulfill each request and send each I/O request to the filter manager 220. The I/O manager 210 may also return data to the applications 205 as operations associated with the file system requests proceed, complete, or abort.

In one implementation, filters comprise objects or the like that when instantiated register (e.g., during their initialization procedure) with a registration mechanism in the filter manager 220. For efficiency, each filter typically will only register for file system requests in which it may be interested in processing. To this end, as part of registration, each filter notifies the filter manager 220 of the types of I/O requests in which it is interested (e.g., create, read, write, close, rename, and so forth). For example, an encryption filter may register for read and write I/Os, but not for others wherein data does not need to be encrypted or decrypted. Similarly, a quota filter may be interested only in object creates and object writes.

In addition to specifying the types of I/O requests in which it is interested, a filter may further specify whether the filter should be notified for pre-callbacks and post callbacks for each of the types of I/O. A pre-callback is called as data associated with an I/O request propagates from the I/O manager 215 towards the file system 225, while a post-callback is called during the completion of the I/O request as data associated with the I/O request propagates from the file system 225 towards the I/O manager 215.

From each I/O request, the filter manager 220 may create a data structure in a uniform format suitable for use by the filters 230-232. Hereinafter, this data structure is sometimes referred to as callback data. The filter manager 220 may then call and pass the callback data to each filter that has registered to receive callbacks for the type of I/O received by the filter manager 220. Any filters registered to receive callbacks for the type of I/Os received by the filter manager are sometimes referred to as registered filters.

Typically, the filter manager 220 passes callback data associated with a particular type of I/O request to each registered filter sequentially in an order in which the registered filters are ordered. For example, if the filters 230 and 232 are registered to receive callbacks for all read I/O requests and are ordered such that the filter 230 is before the filter 232 in processing such requests, then after receiving a read I/O, the filter manager 220 may first call and pass the callback data to the filter 230 and after the filter 230 has processed the callback data, the filter manager 220 may then call and pass the callback data (as modified, if at all) to the filter 232.

A filter may be attached to one or more volumes. That is, a filter may be registered to be called and receive callback data for I/Os related to only one or more than one volumes.

A filter may generate its own I/O request which may then be passed to other filters. For example, an anti-virus filter may wish to read a file before it is opened. A filter may stop an I/O request from propagating further and may instruct the filter manager to report a status code (e.g., success or failure) for the I/O request. A filter may store data in memory and persist this data on disk. In general, a filter may be created to perform any set of actions that may be performed by a kernel-mode or user-mode process and may be reactive (e.g., wait until it receives I/O requests before acting) and/or proactive (e.g., initiate its own I/O requests or perform other actions asynchronously with I/O requests handled by the I/O manager 215).

Figure 3:
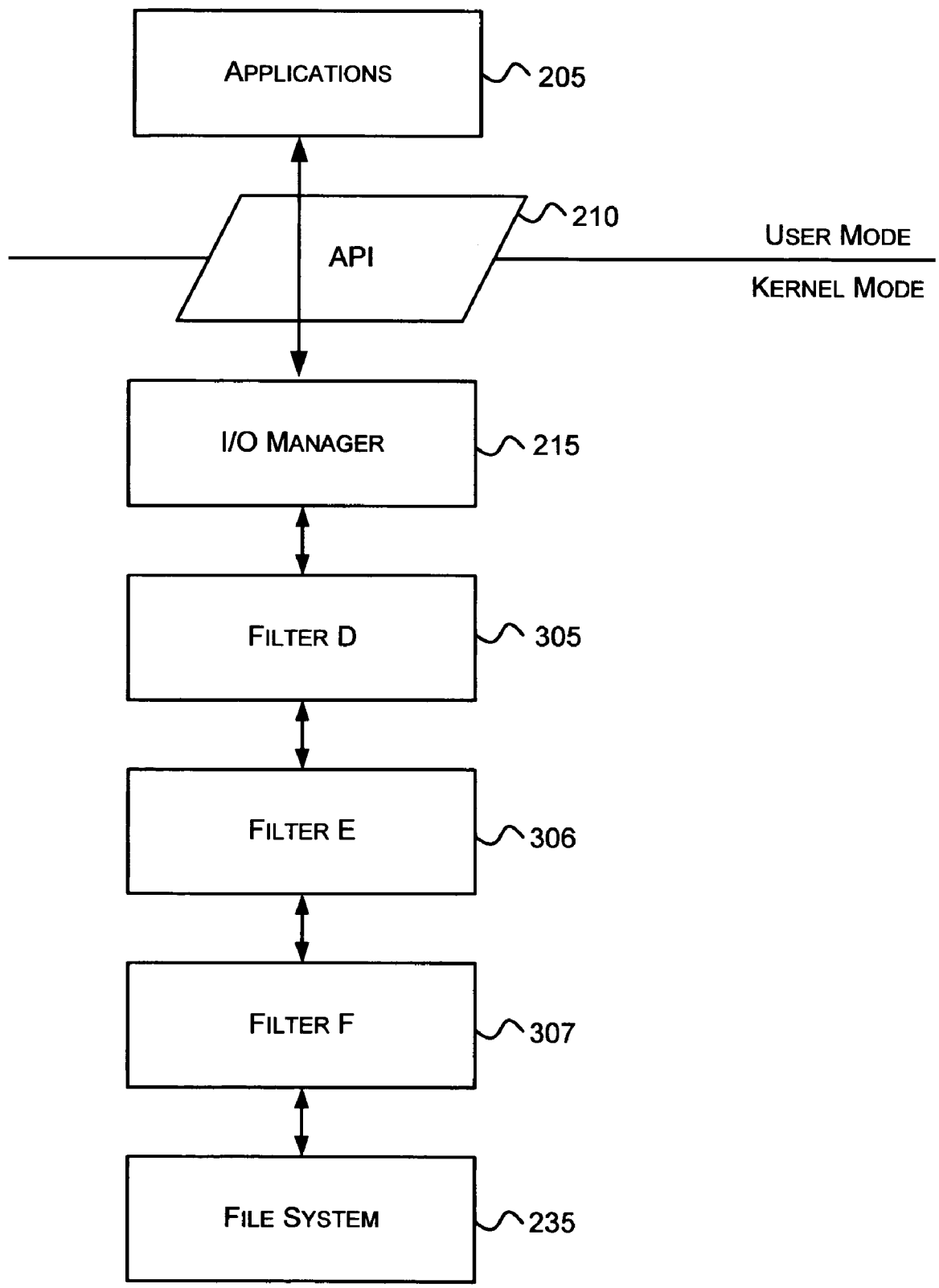
FIG. 3 is a block diagram representing another exemplary arrangement of components of a system in which the present invention may operate in accordance with various aspects of the invention.

In one embodiment, filters may be arranged in a stacked manner as illustrated in FIG. 3, which is a block diagram representing another exemplary arrangement of components of a system in which the present invention may operate in accordance with various aspects of the invention. In this embodiment, each of the filters 305-307 may process I/O requests and pass the requests (modified or unmodified) to another filter or other component in the stack. For example, in response to a read request received from one of the applications 205, the I/O manager 215 may issue an I/O request and send this request to the filter 305. The filter 305 may examine the I/O request and determine that the filter 305 is not interested in the I/O request and then pass the I/O request unchanged to the filter 306. The filter 306 may determine that the filter 306 will perform some action based on the I/O request and may then pass the I/O request (changed or unchanged) to the filter 307. The filter 307 may determine that the filter 307 is not interested in the I/O request and pass the I/O request to the file system 235.

After the file system 235 services the I/O request, it passes the results to the filter 307. Typically, the results pass in an order reverse from that in which the I/O request proceeded (e.g., first to filter 307, then to filter 306, and then to filter 305). Each of the filters 305-307 may examine the results, determine whether the filter is interested in the results, and may perform actions based thereon before passing the results (changed or unchanged) on to another filter or component.

Figure 4:
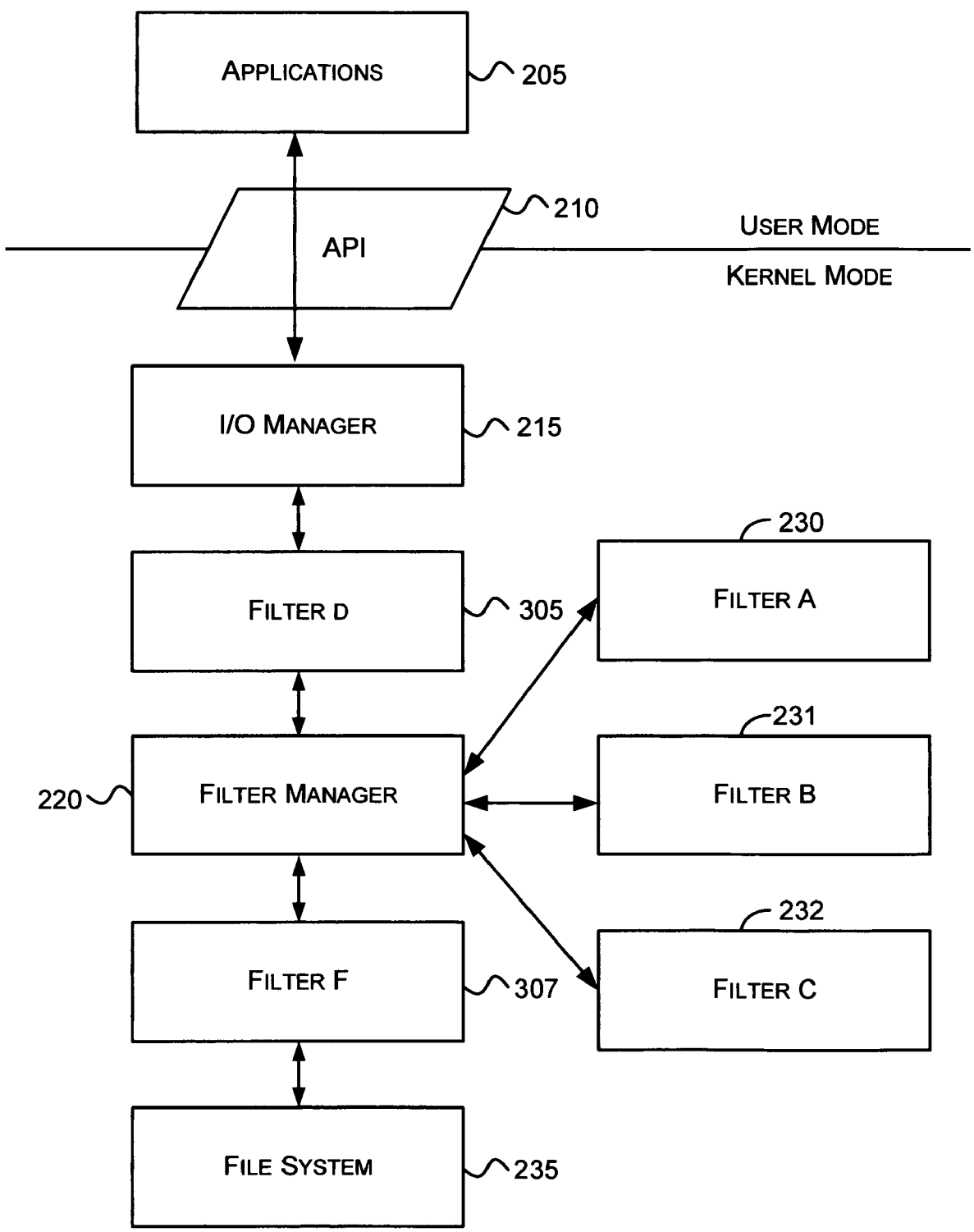
FIG. 4 is a block diagram representing another exemplary arrangement of components of a system in which the present invention may operate in accordance with various aspects of the invention.

In another embodiment of the invention, filters may be arranged in a stacked/managed manner as illustrated in FIG. 4, which is a block diagram representing another exemplary arrangement of components of a system in which the present invention may operate in accordance with various aspects of the invention. In this configuration, some filters are associated with a filter manager while other filters are not. The filter manager 220 is placed in a stack with other filters (e.g., filters 305 and 307).

It will be readily recognized that filters may be implemented in many other configurations without departing from the spirit or scope of the invention. In some embodiments, a filter comprises any object that examines I/O between an application and a file system and that is capable of changing, completing, or aborting the I/O or performing other actions based thereon.

Returning to FIG. 2, the file system 235 may include one or more volumes that may be located locally or remotely to the machine or machines upon which the applications 205 execute.

Some filters monitor files in certain directories. For example, a quota filter may enforce quotas on particular directories. As another example, a data screen filter may deny the creation of certain types of files (e.g., files that may be copyrighted as indicated by an extension such, .MP3, .JPG, and the like) in certain directories. These filters may include a namespace that identifies the directories involved.

Certain file system requests (e.g., renames and deletes) may change the file system namespace for the objects monitored by a filter. For example, a quota filter may be configured to enforce a quota of one gigabyte on an object called C:\DIR\QUOTA. The object's name and the quota applicable to the object may be stored in a metadata file which is persisted on non-volatile storage. An application may rename the object C:\DIR to C:\DIR2 or may move C:\DIR\QUOTA to C:\QUOTA. To continue enforcing the quota on the QUOTA object, the quota filter monitors renames and updates its metadata file each time a rename affects an object for which the quota filter is enforcing a quota.

In some operating systems, a rename operation may rename an object and/or move the object. Thus, by monitoring rename operations, a filter may capture either a name rename, a move of an object, or both. In operating systems in which renaming the file and moving the file are separate operations, a filter may need to monitor both of these operations to maintain namespace consistency with the namespace of a file system.

In addition, an application may delete an object, for example, C:\DIR or C:\DIR\QUOTA. To avoid monitoring objects that have been deleted, not enforce policies when an existing object is deleted and a new object with the same name is recreated in its place, and to reduce the size of the metadata used in monitoring such objects, a filter may monitor deletes and update its metadata accordingly.

Figure 5:
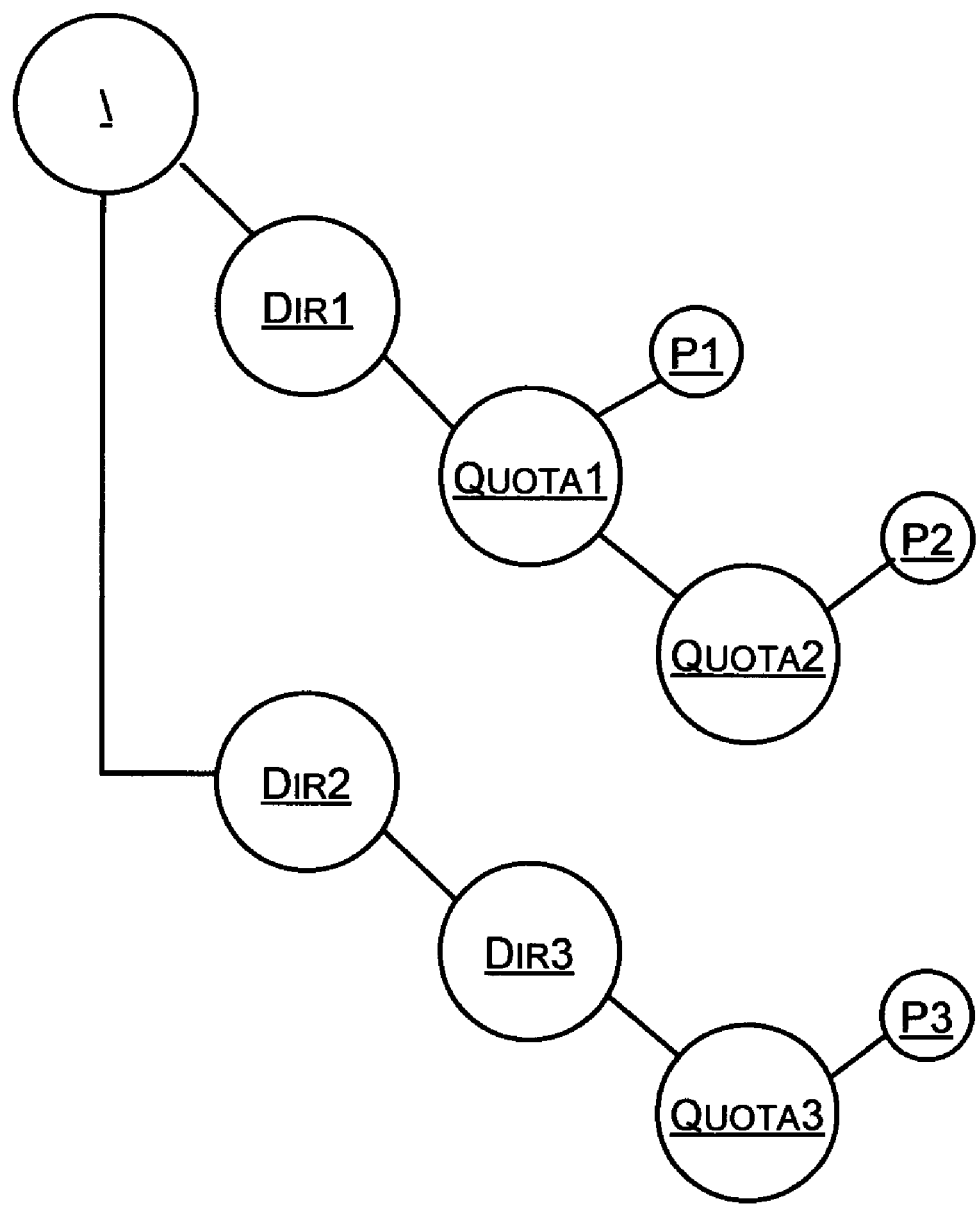
FIG. 5 is a block diagram representing a data structure that may be used to monitor objects that have policies applied to them in accordance with various aspects of the invention.

FIG. 5 is a block diagram representing a data structure that may be used to monitor objects that have policies applied to them in accordance with various aspects of the invention. As referred to herein, monitored objects comprise directories, files, anything that may be stored on a file system, and the like.

The data structure includes a node for each object of interest and is sometimes referred to as a prefix tree. The exemplary objects represented include the root directory "\", \DIR1, \DIR1\QUOTA1, \DIR1\QUOTA1\QUOTA2, \DIR2, \DIR2\DIR3, and \DIR2\DIR3\QUOTA3. The objects \DIR1\QUOTA1, \DIR1\QUOTA1\QUOTA2, and \DIR2\DIR3\QUOTA3 have policies P1, P2, and P3 applied to them, respectively. A policy may comprise a quota on disk space consumed by an object and its descendants (e.g., subdirectories), files allowed in an object and its descendants, what is allowed and/or not allowed with respect to an object and its descendants, and the like. When an object of interest is renamed or deleted on a file system, the data structure shown in FIG. 5 may need to be updated. Such updates may involve removing nodes, adding additional nodes, and changing the contents of nodes as described in more detail below.

In general, an object is of interest if renaming or deleting the object would affect finding the object in the data structure or the application of a policy. For example, if \DIR2 and its subdirectories were deleted, the policy P3 would no longer need to be applied to \DIR2\DIR3\QUOTA3. Furthermore, the nodes DIR2, DIR3, and QUOTA3 would no longer be needed to apply the policy P3 and could be deleted to conserve space and decrease lookup time for any remaining policies.

As another example, if \DIR1\QUOTA1\QUOTA2 is renamed to \QUOTA5 on the file system this may affect finding the new object in the data structure. This is important because before a filter applies a policy to a particular operation, the filter needs to know whether the operation may affect any objects for which policies have been established. To find the new object in the data structure (e.g., so that a filter may determine if it needs to enforce a policy on a particular operation), a new node may be created and associated with the new object, the policies associated with the old node QUOTA2 (e.g., P2) may then be copied to the new node, and the old node QUOTA2 may then be deleted. Policies P2 may then be enforced for the new object. Adding and deleting nodes in response to changes to objects are described in more detail in conjunction with FIGS. 8-10.

An application (e.g., a service or otherwise) may communicate which objects have policies associated with them to a filter. The application may provide a list of such objects or may add and/or delete policies as desired. After receiving such a list or instruction, the filter may create a new data structure or modify an existing one to account for the objects of interest.

The data structure may be reconstructed at boot time or instantiation of a filter that uses the data structure. This may be done using the metafile described above that is persisted on non-volatile storage (e.g., a disk).

The data structure may be shared between more than one filter. For example, two or more filters may enforce policies to objects that may be renamed or deleted. Instead of maintaining a separate copy of the data structure for each filter, the two or more filters may share the data structure. One or more of the filters may be designated to keep the data structure in synch with the file system.

Furthermore, even though the filters may share the data structure, they may not wish to monitor all the same objects.

To this end, additional data may be maintained that indicates which nodes each filter is interested in.

Figure 6:
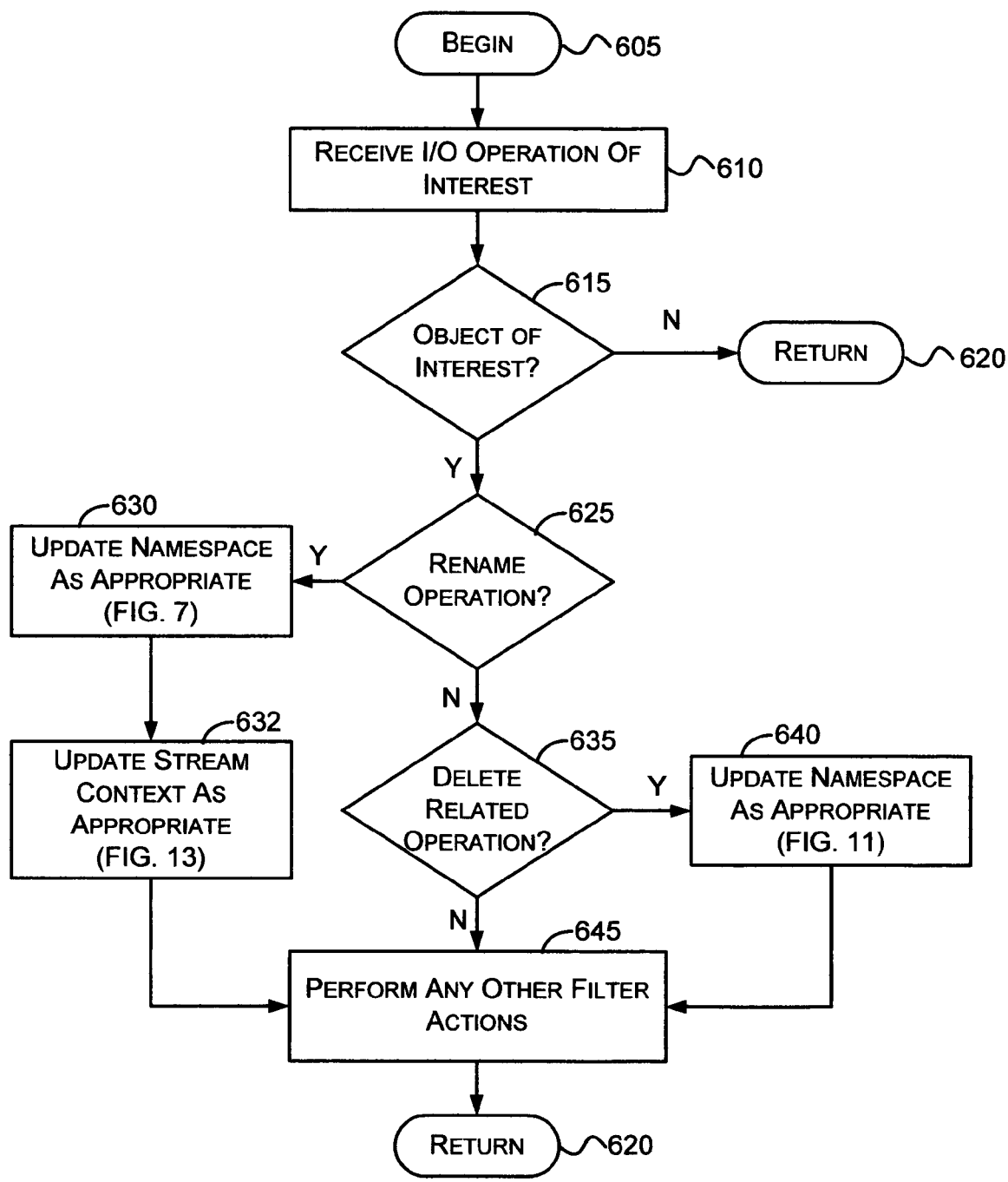
FIG. 6 is a flow diagram that generally represents actions that may occur to maintain consistency between a filter namespace and a file system namespace for objects of interest in accordance with various aspects of the invention.

FIG. 6 is a flow diagram that generally represents actions that may occur to maintain consistency between a filter namespace and a file system namespace for objects of interest in accordance with various aspects of the invention. At block 605, the process begins. At block 610, the filter receives an I/O operation of interest. In the case of managed filters, the filter may have previously registered to receive I/O operations of the type received. In the case of stacked filters, the filter may determine that the I/O is one that may affect the file system namespace. In one implementation, some I/O operations that may affect the file system namespace include rename and delete.

At block 615, a determination is made as to whether the I/O operation relates to an object of interest. If so, processing branches to block 625; otherwise processing branches to block 620 where the process returns. Referring to FIG. 5, an object of interest is an object represented by any node of the data structure. After receiving data associated with an I/O operation of interest, the filter may then perform a lookup on the data structure to determine if the I/O operation involves any nodes therein. If not (e.g., the lookup fails), the filter may return.

At block 625, a determination is made as to whether the I/O operation is a rename operation. If so, processing branches to block 630; otherwise, processing branches to block 635. In another embodiment, the actions associated with blocks 615 and 610 are reversed. That is, first a determination is made as to an I/O operation involves an object of interest, and then a determination is made as to whether the I/O operation is of interest. In this embodiment, If I/O does not involve an object of interest or if the I/O is not an I/O of interest, the process returns.

At block 630, the filter namespace is updated as appropriate as described in more detail in conjunction with FIGS. 7-10. At block 632, a stream context associated with the object is updated if the stream context exists as described in more detail in conjunction with FIG. 13. A stream context comprises data into which information about an object may be stored and retrieved. A stream context may be created for an object, for example, when the object has been marked for deletion. Even though an object may be marked for deletion, it may be renamed before it is deleted. To track the name of the object through renames, the new name of the object is stored in the stream context. Each time the object is renamed, the stream context is updated to include the new name of the object. Then, when the object is finally deleted, the filter looks up the most recent name of the deleted object in the stream context and deletes the appropriate node or nodes from the filter's namespace.

At block 635, a determination is made as to whether the operation is a delete related operation. If so, processing branches to block 640; otherwise, processing branches to block 645. A delete related operation may comprise a create for delete on close operation, a set disposition operation, or a cleanup operation as described in more detail in conjunction with FIG. 11. At block 640, the filter namespace is updated as appropriate as described in more detail in conjunction with FIG. 10.

At block 645, any other filter actions may be performed. For example, a quota filter may enforce a quota by failing or allowing the I/O request to continue. In some implementations, the actions associated with block 645 occur right after block 610. This may allow a filter to fail an operation and stop the changing of any object. At block 620, the process returns.

The process described in conjunction with FIG. 6 may be repeated each time an I/O operation of interest is received.

Figure 7:
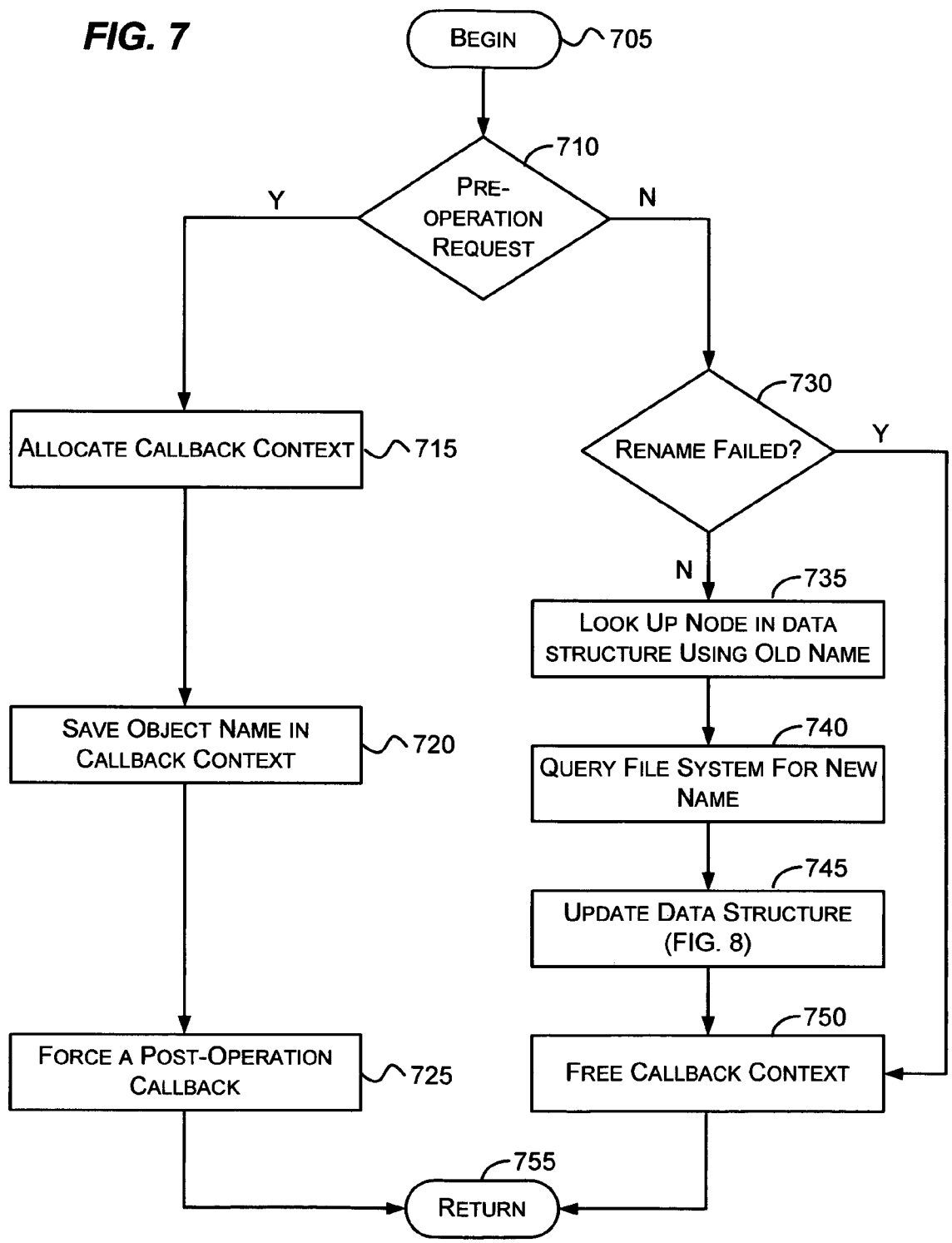
FIG. 7 is a flow diagram that generally represents actions which correspond to block 630 of FIG. 6 which may occur when a rename operation is received in accordance with various aspects of the invention.

FIG. 7 is a flow diagram that generally represents actions which correspond to block 630 of FIG. 6 which may occur when a rename operation is received in accordance with various aspects of the invention. At block 705, the process begins. At block 710, a determination is made as to whether the rename operation is in a pre-callback or post-callback phase. If the operation is in a pre-callback phase (i.e., before the I/O request has propagated to the file system), processing branches to block 715; otherwise, as the operation is in a post-callback phase, processing branches to block 730. In essence, the process waits until the operation has succeeded before updating the data structure.

At block 715, a callback context is allocated and associated with the operation. The callback context may include any data and provides a means for passing data regarding the operation to the post-callback phase. When the post-callback phase occurs for a particular operation, the callback context associated with the operation may be accessed.

At block 720, the name of the object before the operation is performed (i.e., the old name) is stored in the callback context. At block 725, a post-operation callback is forced which essentially means that the filter indicates that it wishes to be called after the operation has been performed on the file system and before the I/O results return to the application.

In the post-operation phase at block 730, a determination is made as to whether the operation failed. If so, processing branches to block 750; otherwise processing branches to block 735. If the operation failed, there is no need to update the data structure.

At block 735, the old name of the object is retrieved from the callback context. This old name is used to find a node in the data structure that maintains the filter namespace. At block 740, the file system is queried for the new name of the object which may include a new object name and/or object path. At block 745, the data structure is updated as described in more detail in conjunction with FIG. 8. At block 750, the callback context is freed. At block 755, the process returns.

Figure 8:
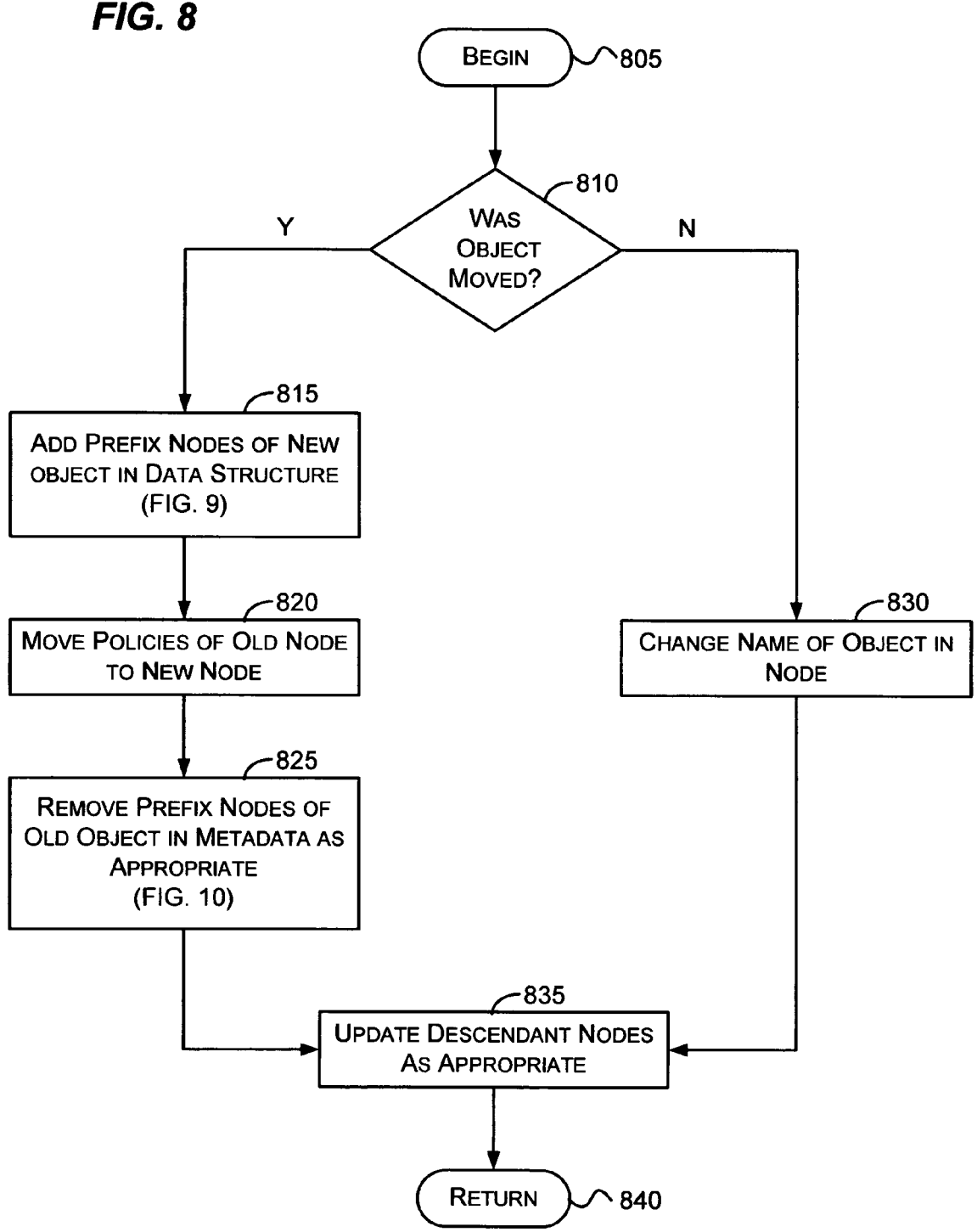
FIG. 8 is a flow diagram that generally represents actions which correspond to block 745 of FIG. 7 that may occur in updating the data structure in accordance with various aspects of the invention.

FIG. 8 is a flow diagram that generally represents actions which correspond to block 745 of FIG. 7 that may occur in updating the data structure in accordance with various aspects of the invention. At block 805, the process begins. At block 810, a determination is made as to whether the object was moved. If so, processing branches to block 815; otherwise, processing branches to block 830. If the object was moved, old nodes may be deleted and new nodes created to update the filter namespace and policies as indicated by blocks 815, 820, and 825. If only the name of the object was changed and not its path, the name of the object as indicated in the node may be changed to the new object name as indicated by block 830.

At block 835, descendant nodes of the moved node may be updated as appropriate. In one implementation, the complete path and object name are stored in each node. For example, referring to FIG. 5, the QUOTA2 node may store \DIR1\QUOTA1\QUOTA2. This may be done to speed execution or for other reasons. When an object name and/or path of a node are changed, each of the nodes that are descendants of the node may be updated to include the new prefix path that includes the new object name and/or path associated with the changed node. In other implementations (e.g., where the complete path and object name are not stored in the node and do not need to be updated in descendant nodes), block 835 may be skipped.

At block 840, the process returns.

Figure 9:
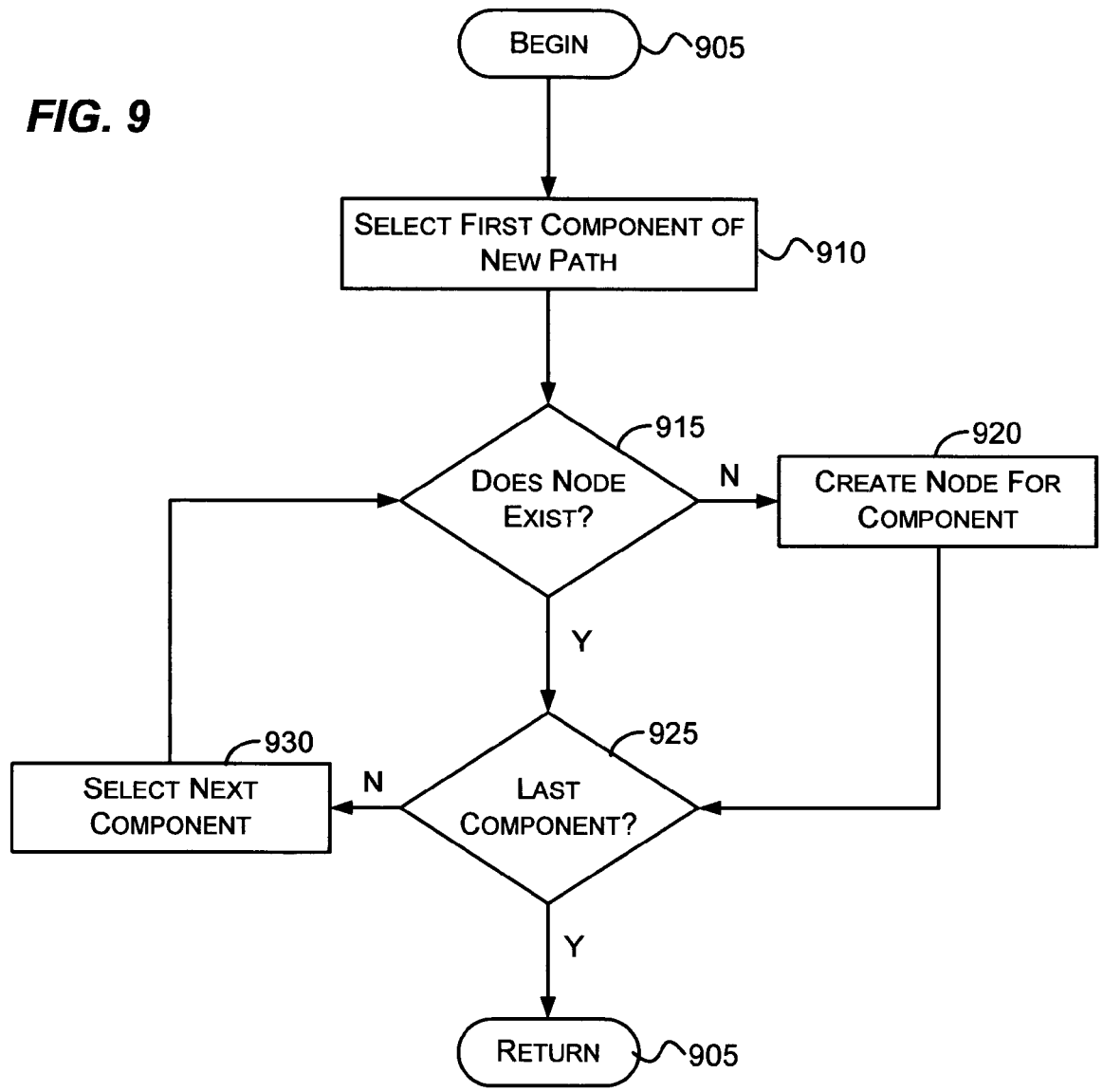
FIG. 9 is a flow diagram generally representing actions which correspond to block 815 of FIG. 8 that may occur in adding nodes when an object is moved in accordance with various aspects of the invention.

FIG. 9 is a flow diagram generally representing actions which correspond to block 815 of FIG. 8 that may occur in adding nodes when an object is moved in accordance with various aspects of the invention. At block 905, the process begins. At block 910, the first component of the new path of the object is selected. As used in a path, component refers to a portion of the path that corresponds to an ancestor object of the object and may include the root directory. For example, the components of \DIR1\QUOTA1\QUOTA2 are root (i.e., "\"), DIR1, QUOTA, and QUOTA2. The first component is root.

At block 915, a determination is made as to whether a node exists that corresponds to the selected component. If so, processing branches to block 925 as a new node does not need to be created; otherwise, processing branches to block 920. At block 920, a new node is created that corresponds to the component.

At block 925, a determination is made as to whether the currently selected component is the last component of the new path. If so, processing branches to block 905 where the process returns. Otherwise, processing branches to block 930 where the next component is selected and the actions associated with blocks 915-925 may be repeated until the last component is processed. It will be recognized that the process described in conjunction with FIG. 9, in essence, modifies the data structure to include nodes for any components in the new path that do not already exist in the data structure.

Figure 10:
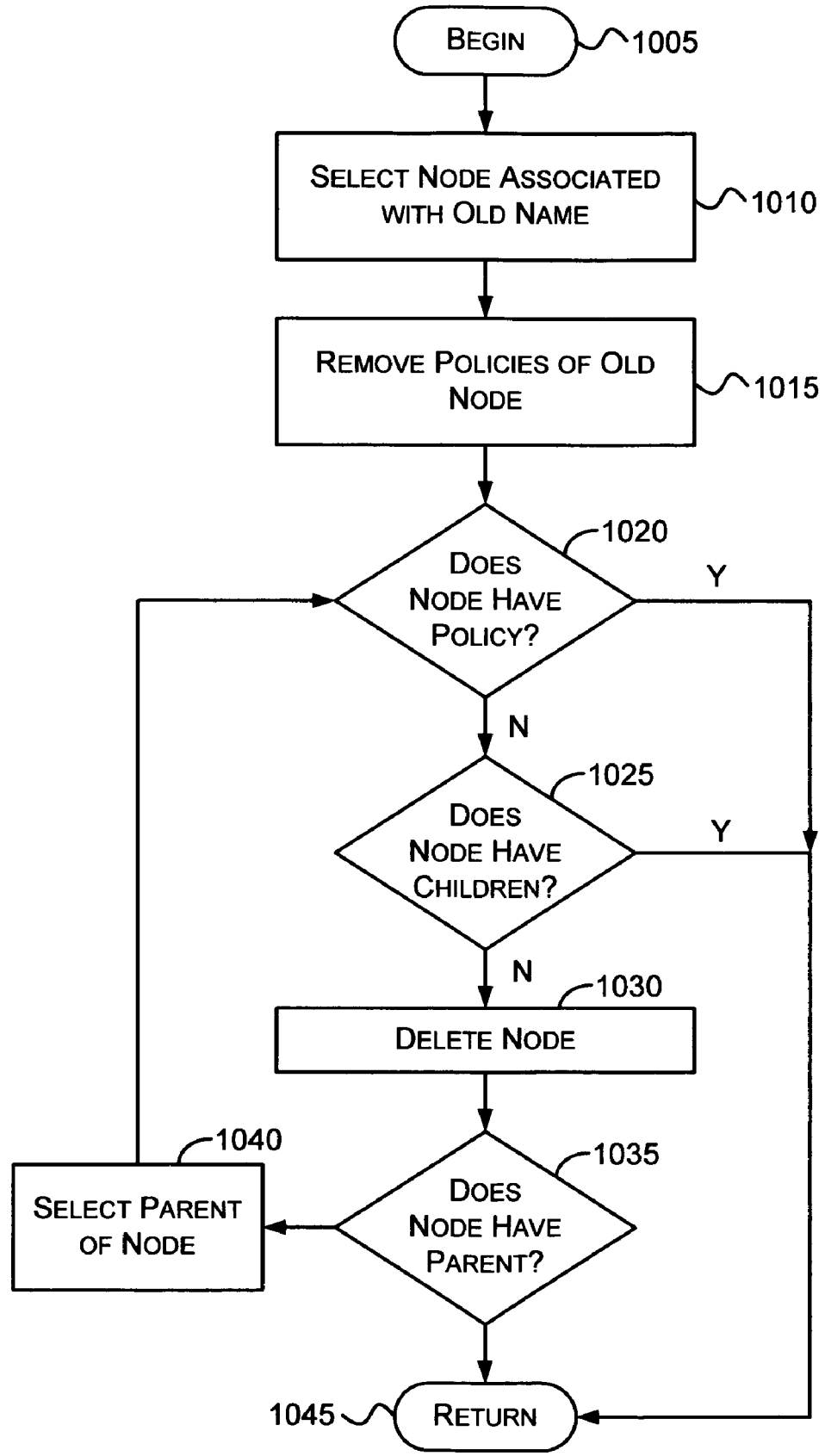
FIG. 10 is a flow diagram that generally represents actions which correspond to block 825 of FIG. 8 that may occur when updating the data structure to remove prefix nodes associated with the old object name in accordance with various aspects of the invention.

FIG. 10 is a flow diagram that generally represents actions which correspond to block 825 of FIG. 8 that may occur when updating the data structure to remove prefix nodes associated with the old object name in accordance with various aspects of the invention. In general, when a node is moved to a new location in the data structure, all nodes that are no longer necessary are removed from the data structure. A node is no longer necessary if it has no descendant that has a policy associated with it and the node itself does not have a policy associated with it.

The process begins at block 1005. At block 1010, the node associated with the old object is selected. At block 1015, the policies of the old node are removed as they have already been copied to the new node previously. At block, 1020, a determination is made as to whether the currently selected node has a policy associated with it. If so, processing branches to block 1045; otherwise, processing branches to block 1025.

At block 1025, a determination is made as to whether the node has any children. If so, processing branches to block 1045; otherwise, processing branches to block 1030. Because nodes are maintained for objects that have policies and their ancestors and are not maintained otherwise, if node has any children, this indicates that at least one of the node's descendants is associated with a policy. For example, if a node that did not have a policy had two children and one of the children was renamed such that it was no longer a descendant of the node, the node would not be deleted unless the second child was also removed.

At block 1030, the node is deleted as it is no longer needed. At block 1035, a determination is made as to whether the node has a parent. If so, processing branches to block 1040, where the parent is selected. From block 1040, processing continues to block 1020 and the actions associated with blocks 1020-1035 may be repeated. It will be recognized, that these actions, in effect, recursively climb the data structure deleting nodes until they find a node that is either itself associated with a policy or which has a descendant associated with a policy.

At block 1045, the process returns.

It will be recognized that the flow diagrams of FIGS. 6-10 represent one way in which a namespace data structure may be updated to be consistent when renames occur to a file system, and that keeping the namespace data structure consistent with the namespace of the file system during renames may be implemented in a variety of ways without departing from the spirit or scope of the invention.

Figure 11:
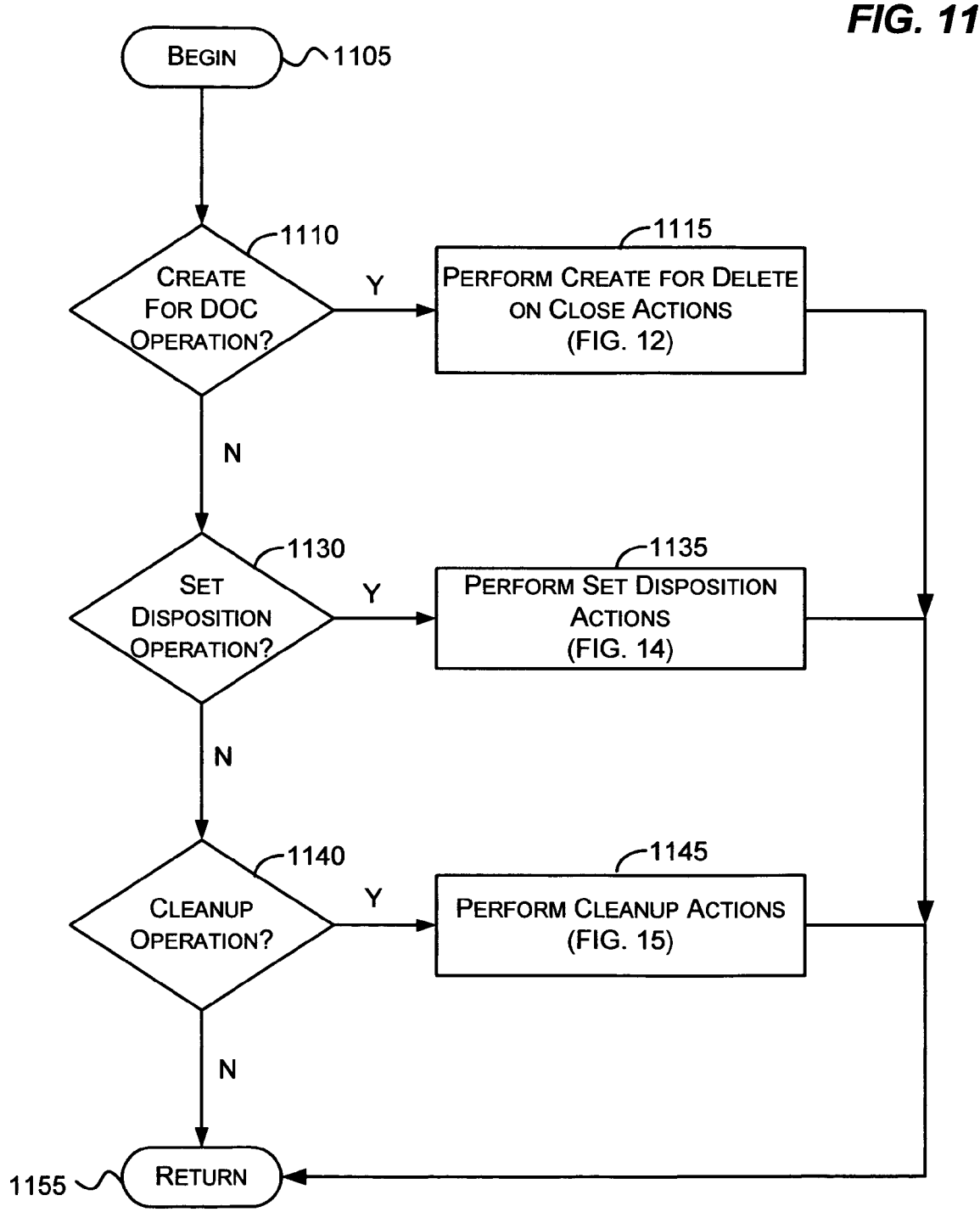
FIG. 11 is a flow diagram that generally represents actions which correspond to block 640 of FIG. 6 that may occur to maintain consistency between a filter namespace and a file system namespace during delete related operations in accordance with various aspects of the invention.

FIG. 11 is a flow diagram that generally represents actions which correspond to block 640 of FIG. 6 that may occur to maintain consistency between a filter namespace and a file system namespace during delete related operations in accordance with various aspects of the invention. At block 1105, the process begins.

At block 1110, a determination is made as to whether the operation is a create for delete on close operation. If so, processing branches to block 1115; otherwise, processing branches to block 1130. A create operation may create an object or open an already-exiting object. An object may be created for delete on close. When an object is created for delete on close, this means that the object should be deleted after the object is closed. That is, the object may be created, exist, and continue to exist, until all processes that have handles to the object have closed their handles. After all the handles have been closed, the object is deleted. At block 1115, actions for the create are performed as described in more detail in conjunction with FIG. 12.

At block 1130, a determination is made as to whether the operation is a set disposition operation. If so, processing branches to block 1135; otherwise, processing branches to block 1140. In one implementation, an object may have a flag associated therewith that indicates whether the object should be deleted after closing all handles to the object. This flag may be set (i.e., indicate that the object should be deleted) or cleared (i.e., indicate that the object should not be deleted). Furthermore, the flag may be set or cleared by each process that has an open handle to the object. Thus, one process may set the flag only to have the flag cleared by another process. The object remains or is deleted depending on the disposition (e.g., set or cleared) of the flag at the time that the last process with a handle to the object closes the handle. At block 1135, actions related to setting the disposition of the object are performed as described in more detail in conjunction with FIG. 14.

At block 1140, a determination is made as to whether the operation is a cleanup operation. If so, processing branches to block 1145; otherwise, processing branches to block 1155. A cleanup operation may be issued each time a process closes a handle to an object. As mentioned previously, however, an object may not actually be deleted until the last process with a handle to the object closes the handle. Even after the last process has closed the object, the object may not be deleted if, for example, at the time of the last close, the flag for deleting the object indicates that the object should not to be deleted upon close. At block 1145, cleanup actions are performed as described in more detail in conjunction with FIG. 15.

At block 1155 the process returns. The process described in conjunction with FIG. 11 may be repeated each time a filter receives a delete related I/O operation for an object of interest.

Figure 12:
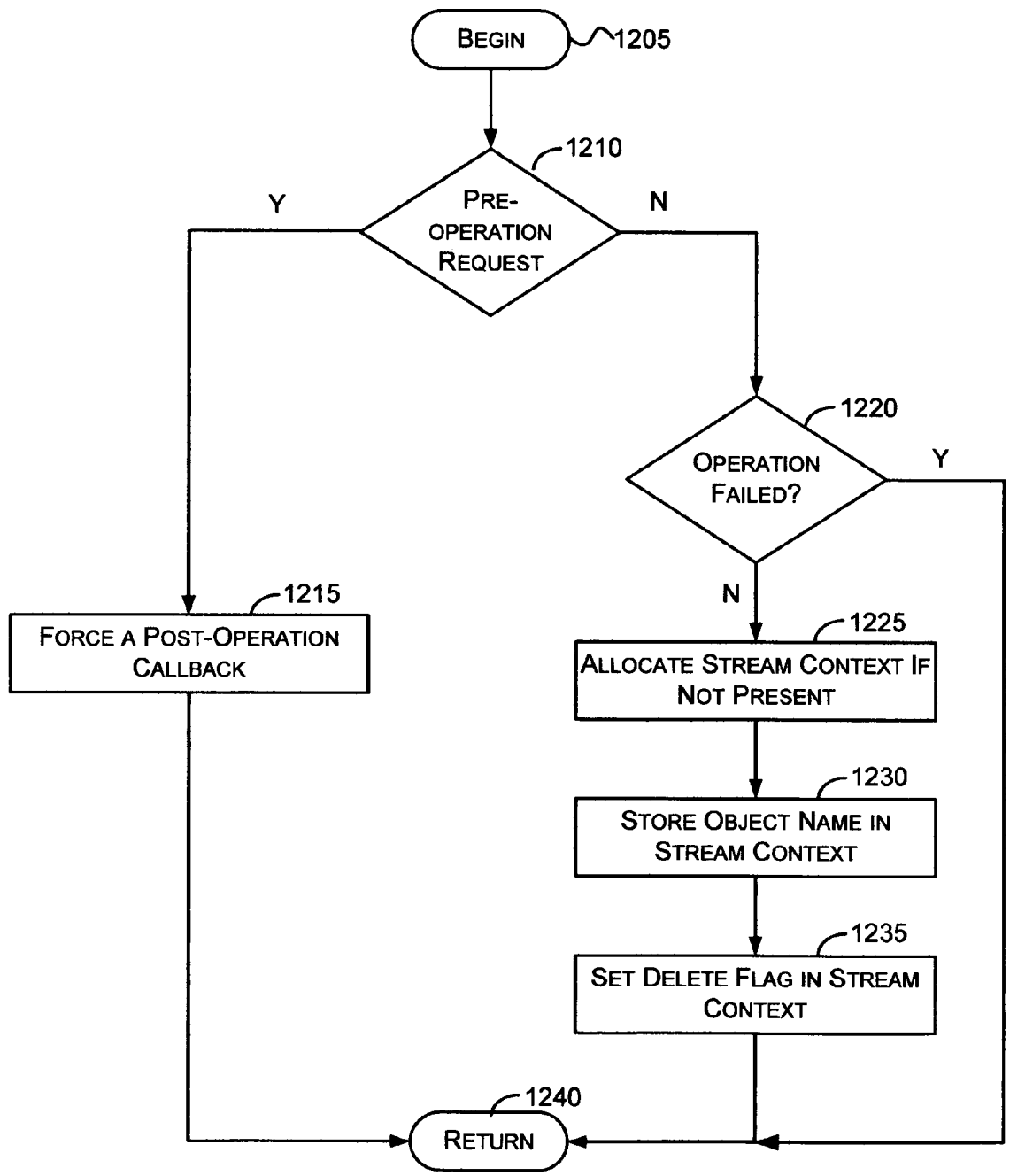
FIG. 12 is a flow diagram that generally represents actions which correspond to block 1115 of FIG. 11 which may occur when a create for delete on close operation is received in accordance with various aspects of the invention.

FIG. 12 is a flow diagram that generally represents actions which correspond to block 1115 of FIG. 11 which may occur when a create for delete on close operation is received in accordance with various aspects of the invention. At block 1205, the process begins.

At block 1210, a determination is made as to whether the operation is in the pre-operation phase. If so, processing branches to block 1215; otherwise, processing branches to block 1220.

At block 1215, a post-operation callback is forced so that the filter will receive a callback during the post-operation phase of the operation. At block 1220, a determination is made as to whether the operation failed. If so, processing branches to block 1240; otherwise, processing branches to block 1225.

At block 1225, a stream context is allocated (if it does not already exist) and associated with the object. At block 1230, the object name is stored in the stream context. At block 1235, a delete flag is updated in the stream context. For objects created for delete on close, the flag may indicate that the object is to be deleted when all handles to the object are closed. This type of flag may not be modified by subsequent processes. When all handles to the object are closed, an object that has been opened for delete on close is deleted.

For objects that have not been opened for delete on close, a flag may be set or cleared (via a set disposition operation) to indicate that the object should or should not be deleted on close. The flag may then be changed by subsequent set disposition operations. Whether the object is deleted after all handles are closed depends on the state of the flag when the last handle to the object is closed.

At block 1240, the process returns.

Figure 13:
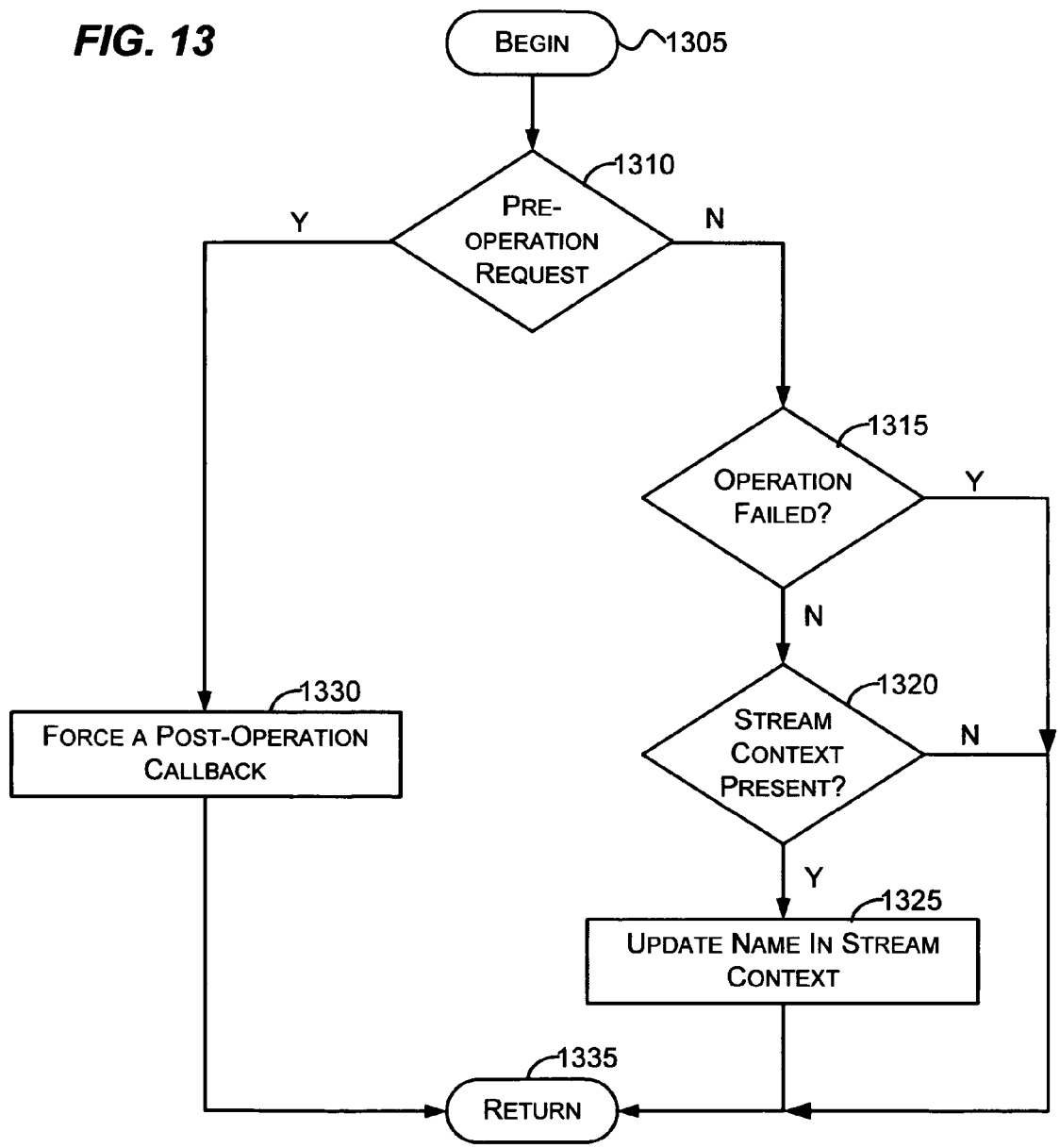
FIG. 13 is a flow diagram that generally represents actions which correspond to block 632 of FIG. 6 which may occur when a rename operation is received in accordance with various aspects of the invention.

FIG. 13 is a flow diagram that generally represents actions which correspond to block 632 of FIG. 6 which may occur when a rename operation is received in accordance with various aspects of the invention. At block 1305, the process begins.

At block 1310, a determination is made as to whether the operation is in the pre-operation phase. If so, processing branches to block 1330; otherwise, processing branches to block 1315.

At block 1330, a post-operation callback is forced so that the filter will receive a callback during the post-operation phase of the operation. At block 1315, a determination is made as to whether the operation failed. If so, processing branches to block 1335; otherwise, processing branches to block 1320.

At block 1320, a determination is made as to whether a stream context exists that is associated with the object. If so, processing branches to block 1325; otherwise, processing branches to block 1335. A stream context may not exist if, for example, the object was not opened for delete on close and no dispositions have been set or cleared on the flag that indicates whether the object should be deleted on close.

At block 1325, the name is updated in the stream context to reflect the name to which the object has been changed. This is useful, for example, later in determining whether the name change will affect any node.

At block 1335, the process returns.

Figure 14:
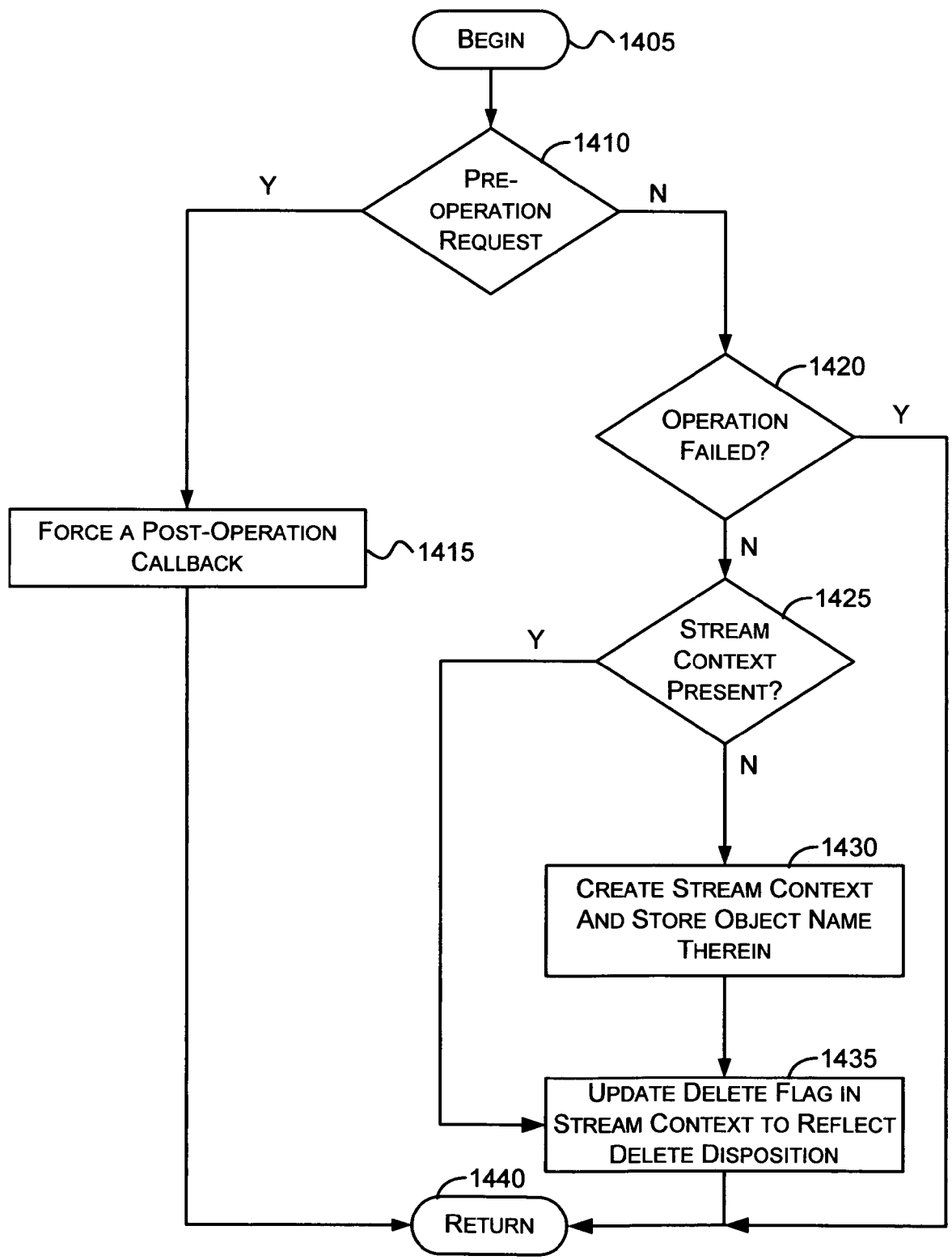
FIG. 14 is a flow diagram that generally represents actions which correspond to block 1135 of FIG. 11 which may occur when a set disposition operation is received in accordance with various aspects of the invention.

FIG. 14 is a flow diagram that generally represents actions which correspond to block 1135 of FIG. 11 which may occur when a set disposition operation is received in accordance with various aspects of the invention. At block 1405, the process begins.

At block 1410, a determination is made as to whether the operation is in the pre-operation phase. If so, processing branches to block 1415; otherwise, processing branches to block 1420.

At block 1415, a post-operation callback is forced so that the filter will receive a callback during the post-operation phase of the operation. At block 1420, a determination is made as to whether the operation failed. If so, processing branches to block 1440; otherwise, processing branches to block 1425.

At block 1425, a determination is made as to whether a stream context exists that is associated with the object. If so, processing branches to block 1435; otherwise, processing branches to block 1430 where a stream context is created and the name of the object stored therein. The stream context is associated with the object.

At block 1435, the delete flag is updated to reflect the delete disposition of the object. As mentioned before, a process may set the flag to indicate that the object should be deleted upon close or clear the flag to indicate that the director should not be deleted on close. At block 1440, the process returns.

Figure 15:
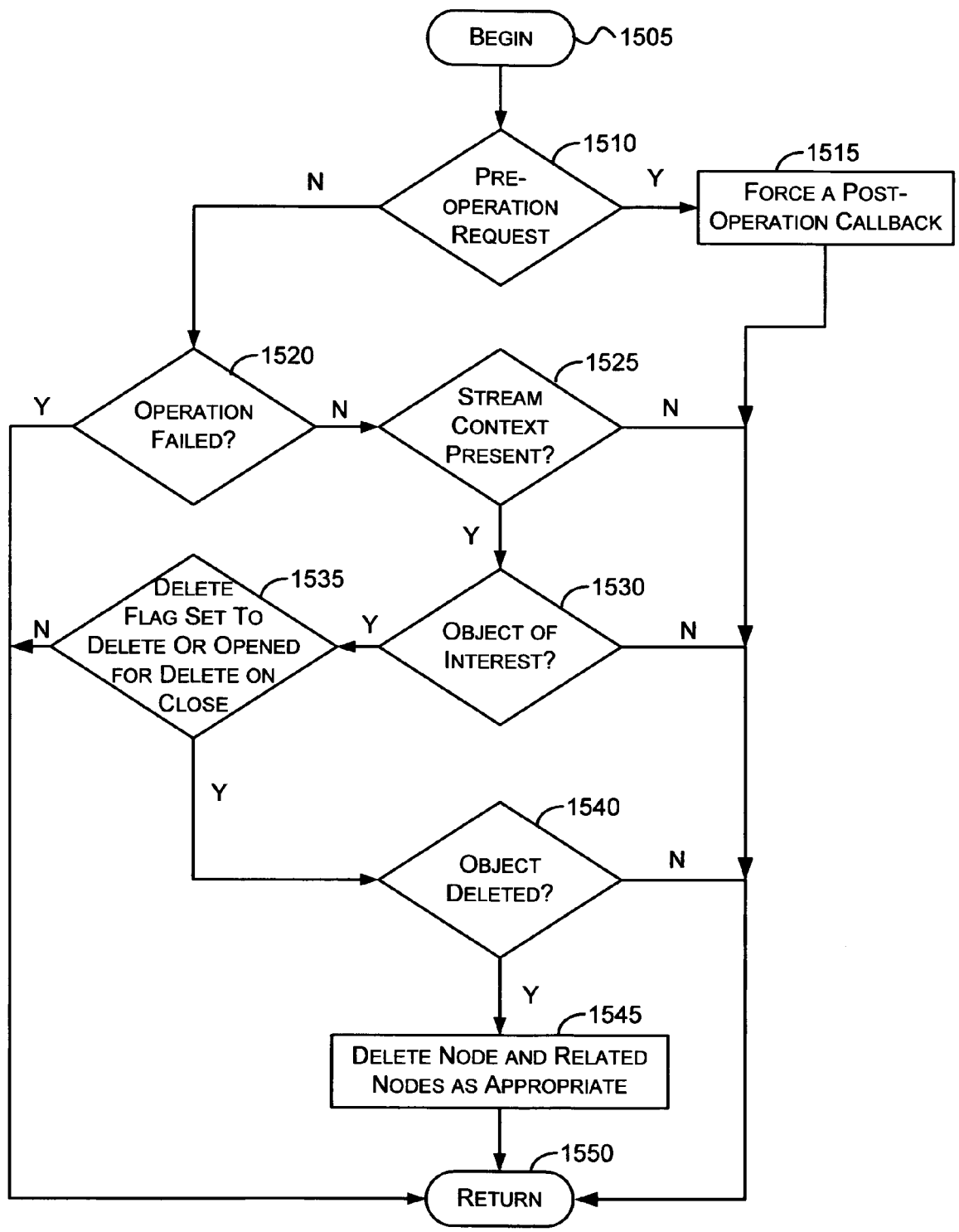
FIG. 15 is a flow diagram that generally represents actions which correspond to block 1145 of FIG. 11 which may occur when a cleanup operation is received in accordance with various aspects of the invention.

FIG. 15 is a flow diagram that generally represents actions which correspond to block 1145 of FIG. 11 which may occur when a cleanup operation is received in accordance with various aspects of the invention. At block 1505, the process begins.

At block 1510, a determination is made as to whether the operation is in the pre-operation phase. If so, processing branches to block 1515; otherwise, processing branches to block 1520.

At block 1515, a post-operation callback is forced so that the filter will receive a callback during the post-operation phase of the operation. At block 1520, a determination is made as to whether the operation failed. If so, processing branches to block 1550; otherwise, processing branches to block 1525.

At block 1525, a determination is made as to whether a stream context exists that is associated with the object. If so, processing branches to block 1530; otherwise, processing branches to block 1550. At block 1530, a determination is made as to whether the object is an object of interest to the filter. If so, processing branches to block 1535; otherwise, processing branches to block 1550.

At block 1535, a determination is made as to whether the delete flag is set to delete or if the object was opened for delete on close. If either of these conditions is met, processing branches to block 1540; otherwise, processing branches to block 1550. In one implementation, when an object is opened for delete on close, it may not be later indicated that the object will not be deleted on close.

At block 1540, a determination is made as to whether the object is deleted. As many processes may open an object and the object is only deleted after all the processes have closed handles to the object, an object may not be deleted even though all the other criteria have been met. In one embodiment of the invention, an operating system may inform the filter when an object has been deleted (instead of the filter checking for itself). In such an embodiment, the method described in conjunction with FIG. 15 may comprise determining if the object is of interest and deleting nodes as appropriate.

At block 1545, the node and any related nodes are deleted as appropriate. If the node is an ancestor of other nodes in the data structure described in conjunction with FIG. 5, the other nodes are also deleted. Furthermore, actions similar to those described in conjunction with FIG. 10 may be performed to delete nodes that are ancestor nodes of the node and that are no longer needed. At block 1550, the process returns.

It will be recognized that the actions described in conjunction with FIGS. 11-15 may be replaced with other actions and may be performed in a different order depending on the way an operating system operates without departing from the spirit or scope of the invention. For example, some operating systems may not have a flag to indicate whether the file should be deleted after all handles to the file are closed. Rather, such operating systems may provide a separate delete operation to delete an object. In such operating systems, a method for detecting changes for deletes may comprise monitoring when an object is deleted and deleting nodes (if any) that are associated with the object.

The force of post-operation callbacks of FIGS. 12-14 may be skipped in implementations in which a post-operation callback occurs by default.

As can be seen from the foregoing detailed description, there is provided a method and system for maintaining namespace consistency with a file system. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-readable storage medium having computer-executable instructions for a filter to monitor I/O requests associated with the filter which, when executed, perform a method comprising:
   instantiating a file system filter associated with a file system, the filter arranged to provide functionality not provided by the file system;
   registering the filter with a registration mechanism in a filter manager;
   the filter notifying the filter manager of at least one type of I/O request in which it is interested;
   the filter specifying whether the filter should be notified for pre-callbacks for the at least one type of I/O request;
   the filter specifying whether the filter should be notified for post callbacks for the at least one type of I/O request;
   maintaining data identifying one or more objects of interest to the filter;
   maintaining a namespace associated with the filter which is distinct from the namespace maintained by the file system;
   receiving an I/O request for an object of the file system;
   the filter manager creating a data structure comprising callback data from the received I/O request;
   determining that the object is an object of interest to the filter;
   the filter manager calling the filter;
   the filter manager passing the callback data to the filter;
   the filter determining a filter action associated with the received I/O request and performing the determined filter action; and
   updating the namespace associated with the filter based on the received I/O request.

2. The computer-readable storage medium of claim 1, wherein the I/O request comprises a rename operation.

3. The computer-readable storage medium of claim 2, wherein the rename operation causes the object to move to a different location in the file system.

4. The computer-readable storage medium of claim 2, wherein the rename operation causes a name associated with the object to change.

5. The computer-readable storage medium of claim 1, wherein the I/O comprises a delete operation.

6. The computer-readable storage medium of claim 5, wherein the delete operation comprises setting a flag to indicate that the object is to be deleted after all handles associated with the object are closed.

7. The computer-readable storage medium of claim 6, further comprising clearing the flag to indicate that the object is not to be deleted.

8. The computer-readable storage medium of claim 1, wherein the I/O request comprises a cleanup operation.

9. The computer-readable storage medium of claim 8, wherein a cleanup operation is issued each time a process closes a handle to the object.

10. The computer-readable storage medium of claim 1, wherein determining that the object is an object of interest to the filter comprises searching for a name of the object in a data structure maintained by the filter.

11. The computer-readable storage medium of claim 10, wherein the data structure is arranged hierarchically.

12. The computer-readable storage medium of claim 10, wherein the data structure includes a node for each object that has a policy associated therewith.

13. The computer-readable storage medium of claim 12, wherein the data structure further includes a node for each ancestor of each object that has a policy associated therewith.

14. The computer-readable storage medium of claim 13, wherein an ancestor comprises a directory in which the object resides.

15. The computer-readable storage medium of claim 1, wherein the object comprises a directory of the file system.

16. The computer-readable storage medium of claim 1, wherein the object comprises a file of the file system.

17. The computer-readable storage medium of claim 1, wherein the I/O request comprises a change to a name of the object.

18. The computer-readable storage medium of claim 1, wherein the I/O request comprises a change to a location of the object in the file system.

19. A method for a filter to monitor I/O requests associated with the filter, the method comprising:
   instantiating a file system filter associated with a file system, the filter arranged to provide functionality not provided by the file system;
   registering the filter with a registration mechanism in a filter manager;
   the filter notifying the filter manager of at least one type of I/O request in which it is interested;
   the filter specifying whether the filter should be notified for pre-callbacks for the at least one type of I/O request;
   the filter specifying whether the filter should be notified for post callbacks for the at least one type of I/O request;
   maintaining data identifying one or more objects of interest to the filter;
   maintaining a namespace associated with the filter which is distinct from the namespace maintained by the file system;
   receiving an I/O request for an object of the file system;
   the filter manager creating a data structure comprising callback data from the received I/O request;
   determining that the object is an object of interest to the filter;
   the filter manager calling the filter;
   the filter manager passing the callback data to the filter;
   the filter determining a filter action associated with the received I/O request and performing the determined filter action; and
   updating the namespace associated with the filter based on the received I/O request.

20. The method of claim 19, further comprising:
   the filter allocating a callback context; and
   the filter forcing a post-operation callback.

21. The method of claim 19, wherein updating the namespace comprises:
   adding a new node of a new object to a data structure;
   moving a policy associated with an old node to the new node; and
   deleting the old node from the data structure.

22. The method of claim 19, further comprising:
   registering a plurality of filters with the registration mechanism; and
   at least one of the plurality of filters passing the callback data to at least one other of the plurality of filters.

* * * * *